Jan. 25, 1966  W. L. HICKS  3,230,999
BALLASTED VEHICLE TIRES
Filed Nov. 22, 1963
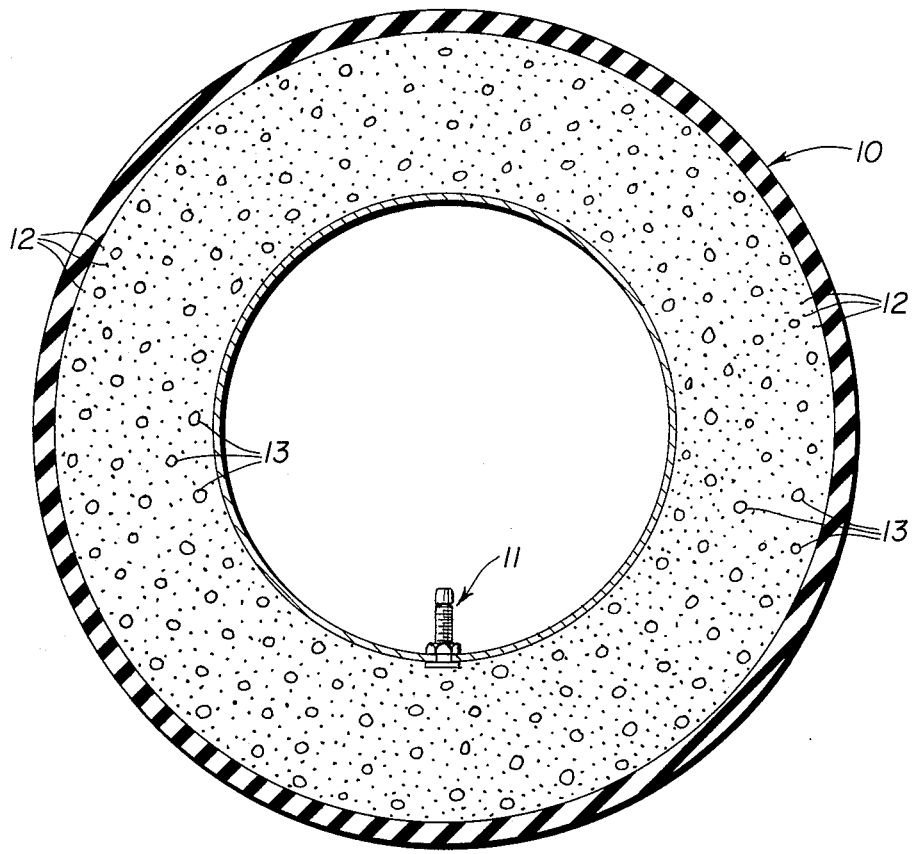
INVENTOR.
WILLIAM L. HICKS
BY
ATTORNEYS

United States Patent Office 3,230,999
Patented Jan. 25, 1966

3,230,999
BALLASTED VEHICLE TIRES
William L. Hicks, 820 8th St., Boulder, Colo.
Filed Nov. 22, 1963, Ser. No. 325,773
14 Claims. (Cl. 152—330)

This invention relates to vehicle tires and more particularly to cushioned pneumatic vehicle tires filled with mineral ballast, and the dry mineral cushion for use in such tires.

My previous United States Patents Nos. 2,884,039 and 3,008,506 describe dry ballast for use in pneumatic tires, which comprises a dry powdered mineral which is filled in a tire to substantially less than completely full of the ballast so that on rotation of the tire the powder is fluidized in the air pressurizing the tire. With the use of the ballast according to these patents, the fluidized ballast in the tires maintains the essential pneumatic characteristics of the tire during operation. Under ideal conditions where the tire is filled to the proper partial fill with the dry powder, and the powder being sufficiently dry so that it does not pack in the tires on standing, the inventions described in the earlier patents are very satisfactory for adding weight to vehicles requiring it.

It has been found in field use that the conditions for loading pneumatic tires and the operation of the tires are less than ideal. Numerous problems are encountered in the actual use of dry ballast, for example, the dry ballast as made at the manufacturing plant ranges from bone dry to about 1.0% moisture, which is within the tolerable limits for use. In storage, however, the powder even absorbs moisture under moderate humidity conditions. Also, the loading and unloading of tires is normally accomplished by air which is moist and probably carries entrained water vapor. Further, the inflating of tires which contain the ballast is done with moist compressed air as commonly found in service stations using commercial air compressing equipment. This results in the ballast being in a moist air atmosphere so that it absorbs moisture over a period of time. The moist ballast packs, and the tires, which are filled less than completely full, begin to lope when the powder fails to be completely fluidized throughout the volume of the tire. The loping is particularly noticeable on first starting, and can be dangerous when the loping occurs after momentary stopping. The powdered ballast, which is dried below the stability conditions with ambient air, almost always absorbs water from the air; thus the ballast, although initially dry, gains a certain amount of the water which is absorbed on the particles themselves. Besides the loping encountered, it has been found that it is difficult to load and unload the ballast from a tire when it is high in moisture content. Additionally, excessive moisture in the ballast causes an excessive heat buildup in the tires during operation, which increases the vapor pressure in the tires to pressures several times that of dry air at the same high temperatures. This undue pressure increases the problem of the maintenance of the tires. Further, it is virtually impossible to teach an operator in the field to fill a tire properly to be within the range of from 80% to 90% full. In the first place, tires are opaque and one cannot see inside the tire. Secondly, it is not practical to attempt to fill the tires by weight of the ballast, since tires of the same size made by different manufacturers vary in volume. Even tires from the same manufacturer vary. New tires cannot be accurately filled by means of weight, and when a tire has been used the volume of it depends upon its previous use, the amount of air maintained in the tire, the loads to which it has been subjected, and the period of use. Thus, while the theory of dry ballast is excellent it has not found wide favor in field use in all machines due to the problems encountered in handling the powder and in actual use in vehicle tires.

According to the present invention I have provided a dry powder which I prefer to call a mineral cushion ballast which will maintain a moisture content, when in storage or in a closed tire, below the equilibrium or hygroscopic water content of the mineral at the temperature and the humidity at which it is handled. The mineral cushion is provided with an incorporated irreversible desiccant composition which will absorb any residual water in the air or in the mineral. Thus, free water present will be maintained physically locked so that it will not vaporize under the operating conditions of the mineral in the tires. The mineral cushion of the present invention, furthermore, provides a means for completely filling the vessel into which the mineral cushion is to be used, whether it be a tire, Dewar flask or the like, and the completely filled vessel retains pneumatic characteristics.

One of the objects of the present invention is to provide a mineral cushion for use in pneumatic tires which will maintain a vaporizable moisture content of the mineral and its atmosphere, when in the pneumatic tire, at or below the equilibrium or hydroscopic water content of the mineral at the temperature and humidity at which it was installed in the tire.

It is another object of the invention to provide a dry mineral blend which includes a weighting material formed of a fine powder and having incorporated therein a desiccate which essentially irreversibly ties up any moisture in the mineral and in the vessel in which it is contained, so as to maintain the moisture of the occluded air between the mineral particles so low that under operating conditions no moisture will condense on the mineral particles.

Still another object of this invention is to provide for vehicle tires a mineral cushion having incorporated therein a predetermined portion of expanded, flexible particles which expand and contract with the movement or pressure of the mineral in the contained vessel, thereby maintaining the vessel essentially completely filled while retaining the essential pneumatic characteristics of the filling material.

These and other objects of the invention may readily be ascertained by referring to the following description, which is intended as illustrative of the invention, and the single figure of the appended drawing, which schematically represents a pneumatic tire filled with ballast according to the invention.

In general, the invention provides for a dry mineral cushion blend, of which a substantial portion is an essentially non-compressible powdered mineral in a size range of from about +10 to −200 mesh particles, Tyler screen sizes, along with a chemical dehydrating agent, present in a range of from 0.5 to 6% by weight of the ballast material, which preferably combines chemically with free moisture. In a preferred form a small percent of anhydrous calcium sulfate is mixed with the powdered mineral so as to maintain the mineral completely dry. Additionally, the dry mineral is combined with a material which acts as a cushion, thereby providing means for completely filling the space in a vessel or tire. One preferred cushion material is expanded vermiculite. With the addition of the expanded material in the powdered mineral blend, a vessel or tire may be completely filled with the mineral composition. Air under pressure is added to pneumatic tires, and such tires maintain their essential pneumatic characteristics. Mineral compositions with the cushioning material is compressible to some extent.

In the drawing, a tire 10 is filled with ballast, according to the invention, which includes a fine particulate material 12, in general a mineral in the size range of from +10 to −200 mesh, and a dehydrating agent, as defined herein. A cushioning material 13 is interspersed throughout the particulate material, the cushioning agent being defined below. The tire is filled with the ballast mixture until no further ballast material can be added. The ballast is inserted into the tire by means of a powder pump with a small amount of air, or by other convenient means, until no further powder can be forced into the tire through a filling opening or valve stem, shown in general by the numeral 11. In certain instances, a vibrator on the tire or a hammer striking the tire may be used to insure that no more powdered ballast can be forced into the tire under the loading conditions. The tire is then considered completely or essentially 100% filled with powdered ballast when no more powder can be forced into the tire. Since the material is particulate some space remains between the particles and the tire may be pressurized with a gas, commonly air. Tires completely filled with the powdered ballast are readily pressurized to normal or recommended air pressure for particular operation.

The mineral compositions in the formulations set out below are given as percentages by weight. However, I find that the cushioning agent is preferably added in percentage by volume. A range of from about 5% to about 25% by volume being desirable limits for its use. Since cushioning material, including expanded minerals, organic expanded plastics, and other materials suitable for use as a cushioning agent may vary considerably in volume per unit of weight, it is important that this ingredient be added on the basis of a percent by volume rather than percentage by weight.

The cushioning agent is a particulate mass preferably in the size range of from 10 to 100 mesh, although sizes somewhat more or somewhat less are satisfactory. The particles of the cushioning agent must be resilient so as to flex, contract and reduce in actual dimensions or volume under pressure but to restore to substantially full volume on release of the pressure. Expanded vermiculite is an excellent cushioning agent as it contracts and expands easily and is long lasting under such flexure. The expanded vermiculite acts as a mineral spring in ballast.

The cushion agent must contract under pressure and restore to full volume on release of the pressure. The cushioning agent, generally, is a light weight particle having occluded air therein. Such particles must be flexible and capable of extended periods of contraction and expansion without breaking or rupturing. Such materials as expanded minerals are useful as cushioning agents, and these include vermiculite, perlite, pumicite, sodium silicate, etc. Expanded plastics such as polyethylene, polystyrenes, polypropylene, etc., which are resilient and flexible synthetic resins, are generally hollow spheres and can be graded to a uniform size and are useful as cushioning agents. Various expanded rubbers, natural and synthetic are, likewise, useful. The hollow spheres, which includes some of the expanded minerals such as perlite, pumicite, etc., as well as the expanded plastics and rubbers, are highly useful as cushioning agents since the spheres contain occluded air and flex sufficiently to permit movement of the ballast under pressure so as to act as a pneumatic filling for tires and other vessels.

The problem created by moisture in a tire can be demonstrated by heating a tire containing dry nitrogen or other dry gases from 70° F. to 300° F. This produces but an increase in pressure of 43% over the initial 40 lbs. per square inch pressure, for example. The same tire inflated to 40 lbs. per square inch with a gas carrying sufficient entrained moisture to be saturated at 300° F., developed an added vapor pressure when the temperature is increased to 300° F. so that the total pressure is over 300% more than the pressure at the 70° F.

Many different types of minerals may be used in making a dry mineral cushion for pneumatic tires as explained in my prior patents. When used in a tire under less than completely full conditions, however, the minerals are subject to grinding or attrition and thus may change in actual relative volume of material. Some minerals, such as barites are stable when ground into a fine powder, while others, such as talc or diatomaceous earth, increase in volume as they are ground. Others, such as expanded perlite, sodium silicate, and the like, actually decrease in volume as they are ground to a finer particle. By adding a sponge-like, resilient cushion material according to the present invention, the tires may be completely filled with the powder and still obtain an essentially pneumatic tire. Such a filled tire will provide the desired operating qualities without actual relative movement of the particles in the tire when it is turning in the tire as in the case of my previous patents, where the powder becomes fluidized as it absorbs air in the tire itself. The following examples are merely illustrative of different compositions and use of such compositions and are not intended as limiting the scope or concept of the invention.

EXAMPLE I

Two 12 x 28 tractor tire casings were mounted as tubeless tires and were filled with 750 pounds each of a 200 mesh limestone. This was prepared by grinding limestone to about 90% −200 mesh, and during the grinding 5 pounds of stearic acid per ton was added to coat the limestone with a film of calcium stearate. The resulting product was a free flowing, water resistant mineral. The filling of the tire was done with compressed air which was known to be essentially saturated with some additional entrained moisture. An analyses of the powdered mineral going into the tire showed that it contained 0.5% of moisture. With the stated amount of mineral, the tires were filled to what was considered to be a 90% fill, inflated with air and placed in operation. After several weeks of operation, it was noted that the tractor did not drive straight and loped at speeds up to 20 miles per hour, particularly after stopping for a few minutes or a period of time. This was an indication of unbalanced tires in operation. It was additionally noted that the tires became quite warm after operation at speeds of 15 to 20 miles per hour for a distance of 10 to 15 miles. A sample of the mineral was removed and analyzed, and it showed 0.6% of moisture.

A half and half mixture by weight of hot lime and 20 mesh expanded vermiculite, in the amount of about 20 pounds, was added to each tire, which made each tire essentially completely full. (This gave a percentage by volume of vermiculite of about 8.0%.) The additional material was made to provide a fill of between 98 and 100% full. The actual fill appeared to be 100% since no additional material could be introduced. Each filled tire was then inflated and operation continued. During operation, the tires, with the hot lime and the vermiculite, displayed no loping after several weeks' operation. After running for 15 miles at an estimated speed of between 15 and 20 miles per hour, the tires were substantially cooler than the tires under the partially filled condition. The tires had a a flat spot at ground contact and acted like all air filled tires.

EXAMPLE II

The rolling qualities of two tractors with ballast were tested to show differences between different types of ballast. Two similar tractors, each having 12 x 28 rear tires, were used for the test. The tires of the first tractor were filled with air and 1000 pounds of cast iron was added to each end of the tractor axles. The tires of the second tractor were weighted with 1000 pounds of liquid calcium chloride pumped inside of two of them as liquid ballast. Each of the tractors was then allowed to roll freely in the same distance down a short hill and onto a level stretch at its bottom. The tractor with the air-filled tires and the steel weights rolled considerably further on the level, showing the dragging action of the liquid ballasted tractor tires. The cast iron weights were then removed from the first tractor and 1000 pounds of a powdered ballast were added to each of the two rear tires which provided about a 90% fill in each tire. The tractor was allowed to remain idle for two hours at the top of the hill. On rolling down the hill it was observed that the tires were not in balance, since the tractor loped. When this tractor was pushed about three feet forward on the level, it proceeded to roll back again when released, indicating the tires were heavy on one side and unbalanced. When the tractor was started out rapidly, it was observed the tires were dangerously out of balance, causing the tractor to wobble violently from side to side as it was driven at 15 miles per hour.

The mineral blend in each of the tires was then removed and reformulated as follows:

| | By weight, parts | By volume, parts |
|---|---|---|
| 200 mesh limestone | 92.7 | 90 |
| Calcium oxide or hot lime | 3.0 | |
| Tall oil fatty acids | 0.3 | |
| 20 mesh expanded vermiculite | | 10 |

The materials were completely mixed together, after being formulated by weight and by volume as shown, and the homogenous mix was then pumped back into the two tires to completely fill the tires to their calculated capacity, where no additional material could be forced into the tires. The tires were inflated to 18 pounds operating pressure. The tires were observed to be in balance on operating the tractor even after standing for two days. The tractor parked on a level cement floor could be pushed around easily, indicating the balanced tires even after standing. Additionally, rapid acceleration of the tractor from the parked position showed no unbalanced condition of the ballasted tires. The tires were observed to flex in the normal manner of a pneumatic tire, indicating satisfactory operation of the tires, particularly at their bottom or contact surface.

EXAMPLE III

A ballast of the following composition was prepared, on a weight basis:

| | Parts |
|---|---|
| 200 mesh limestone | 47.0 |
| 20-50 mesh iron pyrite | 47.0 |
| 20 mesh expanded vermiculite | 1.5 |
| Surface active agent | .3 |

It was calculated that the percentage of vermiculite given above by weight equaled 16% by volume of the composition.

All of the ingredients were first thoroughly mixed, and a sample was analyzed to show it contained 0.3% by weight of volatile moisture. About 2.0% by weight of calcium oxide was added to the formula, with mixing, to distribute the calcium oxide throughout the mixture. Two 12 x 38 rear tires of a tractor were filled with the mix to as near 100% of their capacity as possible. When the tires appeared to be completely full, they were inflated with air to 18 pounds operating pressure. The tractor was operated in field use for four hours, after which it was stopped and the mineral allowed to stand in the tires without moving for two days. Without rotation of the tractor tires, the tractor was jacked up and the tires were rotated by hand. It was observed from the start that the tires were in balance and that they rotated easily and smoothly, indicating that the tires were in balance in their static condition after standing. The tractor was then operated at speeds up to 25 miles an hour on the ground, without any loping or jerking, indicating that the tires were in balance at all times. The flexing of the tires was noted and it was observed to be substantially equal to tires filled with only air at the same pressure. The tractor was driven over a highway for a distance of about 20 miles at an average speed of 17 miles per hour. It was noted that the tires heated very little and substantially less than the temperature noted for similar tires operating for this distance with either liquid ballast or a dry ballast at 90% fill. A sample of the ballast of the present invention was removed from the tire immediately after the highway test, and an analysis showed that it had a temperature of 95° F. and contained about 0.0% free moisture when dried at 200° F.

EXAMPLE IV

Two 26.5 x 25 earthmover tires from a high speed motor scraper were filled with the following composition:

| | By weight, parts | By volume, parts |
|---|---|---|
| Diatomaceous earth, 95% at —200 mesh | 80.0 | 80 |
| Diatomaceous earth, 20-30 mesh | 10.0 | |
| Anhydrous calcium sulfate | 4.5 | |
| Tall oil surface active agent | 0.5 | |
| 20-30 mesh expanded vermiculite | | 20 |

The tires were filled with a powder pump consisting of a rubber housed metal screw, pushing the powdered dry ballast into a rubber hose leading into the tire cavity. A small amount of air for fluidizing the powder was added at the outlet of the pump. During the filling operation the pump was operated about 1200 r.p.m. and it was continued until the tire appeared to be completely full. The speed of the pump was then reduced to about 100 r.p.m. to slowly pack more powder into the tire at the slower speeds and at the higher pressure in the tire. The pressure at the outlet of the pump was observed to be about 15 pounds. The back pressure in the tire was slowly raised to be about 10 pounds, by the partial closing off of the air outlet leading off from the tire cavity. By use of this procedure, and the slower speed of the pump, an estimated 20% more powder was added and packed into the tires.

After filling and inflating of the tires to about 18 pounds, they were then observed in operation on the scraper. The flex of each tire and its bounce were observed to be similar to an air-filled tire. At high speeds of up to 30 miles per hour the tires were balanced at all times and they acted as if they had a built-in shock absorber. These tires did not bounce like air-filled tires, but seemed to absorb the bumps of the road with very little bouncing of the scraper.

An analysis of the powder mineral blend without the anhydrous calcium sulfate showed a moisture content of 0.9%. After several days of operation of tires filled with the mineral blend with anhydrous calcium sulfate, a sample was taken from such tires which showed about 0.0% moisture.

EXAMPLE V

Two 12 x 38 farm tractor tires were filled with a mineral composition consisting of:

| | Parts |
|---|---|
| Talc —200 mesh | 30 |
| Iron ore —30 to +80 mesh | 70 |

The tires were first filled to an 83% level following the teachings of my U.S. Patent No. 3,008,506. At this level the tires were out of balance and the tractor wobbled dangerously when the tractor was rapidly accelerated up to about 20 miles per hour after standing for a short period. The tires were then filled to a 90% level with the same ballast and the same results occurred after standing. The tires were still out of balance on accelerating to 20 miles per hour from a standing position. The tires were then filled to a 95% level and after standing, the tractor was accelerated to 20 miles per hour, but the tires still showed that they were out of balance. The tires were then filled to a 100% level with the talc and iron ore until no further powder could be forced into the tires. The tractor was accelerated from a standing position to about 20 miles per hour and it showed that the tires were in balance. However, the tires were solid, did not flex and they showed no pneumatic qualities such as found in air-filled tires.

The tires were then emptied and filled with a formulation according to the following:

| | Parts |
|---|---|
| Talc | 29.0 |
| Iron ore | 68.0 |
| Calcium oxide | 2.5 |
| Tall oil fatty acid | 0.5 |

To this mineral mixture by weight was added a cushioning agent by volume as follows:

| | Parts |
|---|---|
| Above mineral mixture | 93 |
| 20 to 30 mesh vermiculite | 7 |

The resulting mixed formulation was pumped back into the tires to a 100% fill or until no more powder could be forced in. The tires were then observed to be flexible after inflation and operation, similar to any pneumatic tire, and could be operated or accelerated without wobbling. The tractor could be quickly accelerated to 20 miles per hour without demonstrating any unbalanced condition.

EXAMPLE VI

Two 23.5 x 25 tires on a motor scraper were filled to maximum capacity with a dry ballast of the following formula:

| | Percent by weight |
|---|---|
| Limestone 90% —200 mesh | 99.5 |
| Tall oil fatty acids | 0.5 |

During the filling operation the tires were pounded repeatedly with a heavy hammer to settle the ballast as much as possible and to permit the filling of the tire to completely full. After filling with as much powder as could be forced in under the pressure of operation, the tires were then inflated to 40 pounds, with air pressure. At speeds up to 35 miles per hour the tires were indicated to be in balance; however, they were too solid and they did not flex properly, as do pneumatic tires. After one day or about 8 hours of operation, the temperature of the tires was carefully checked using a thermocouple inserted into the tread at the hottest point of the tires. The temperature of the filled tires was found to be 79° F. and the temperature of the trailing unfilled tires of the scraper to be 89° F. or 10 degrees warmer. This demonstrated the reduced tire temperatures which can be obtained by the reduced flexing of a completely filled tire when in operation. However, it was found that the tires did not flex enough for operator comfort. The ballast composition was then removed and blended with a cushion type material, a lighter weight mineral and a drying agent according to the following formula:

| | By weight, parts | By volume, parts |
|---|---|---|
| Limestone, 90%, —200 mesh | 18 | |
| Diatomaceous earth | 72 | 94 |
| Anhydrous calcium sulfate | 2 | |
| 20-30 mesh expanded vermiculite | | 6 |

The material according to the above formulation was then pumped into the tires at the same maximum capacity, that is, completely full, using an electric vibrator to settle the composition referred to as a mineral cushion in the tires to get the maximum fill. After inflating the tires to 40 pounds, with the indicated 100% fill of the mineral blend, it was observed that they were in satisfactory balance in operation. In operation of the motor usually low in comparison to the temperature of air-filled tires under the same operating conditions.

EXAMPLE VII

Two 12 x 28 tractor tires were observed which had been partially filled and operated with a dry ballast consisting of —200 mesh barium sulfate in accordance with my prior patents. After extensive operation for several years, the ballast was removed and the inner tube of the tire was examined. Small holes were worn in the inner tube on the outer circumference of the tube. This was denoted to mean that the ballast was sliding in the tire when in actual operation.

To the removed barium sulfate was added desiccant and a cushion material according to the following formulation:

| | Parts by weight, percent | By volume, parts |
|---|---|---|
| Barium sulfate, —200 mesh | 97.7 | |
| Anhydrous calcium sulfate | 2.0 | 93 |
| Tall oil fatty acids | .3 | |
| 20 mesh foamed plastic beads | | 7 |

The tires were then provided with new inner tubes and the above formulation pumped into the tires to a 100% level full. The tires, after substantial use, did not show any wear on the inner tubes themselves. The tire was in balance at all times, even after extended periods of standing. No difficulty was noted in determining the fill of the tires since they were filled to 100%. Additionally, the tires were noted to maintain their essential pneumatic characteristics in the use of the tractor.

EXAMPLE VIII

The rear tires of an industrial tractor were filled with a mineral consisting of barium sulfate which was about 90% —200 mesh size. Each tire was filled to a level where it was about 90% full. After several days of operation of the tractor a sample of the ballast was taken from one of the tires and it showed a moisture content of 0.5% by weight of dry mineral. A thermometer inserted into the mineral of the tire after 20 miles of driving at speeds of 15 to 20 miles per hour showed an average temperature in the mineral of 280° F.

The mineral was removed from one tire and sufficient hot lime was added to make about 2.0% of the weight of the mineal composition, and expanded vermiculite was added to make up to 6% by volume of the complete composition. The tire was then filled completely full and each tire was inflated to the same 18 pounds air pressure. The operation of the tractor was continued and, after operating over the road for the same period of time, it was noted that the tire containing no hot lime or vermiculite ran considerably warmer and appeared to have a pressure substantially greater than the tire filled completely full with the ballast containing the hot lime and vermiculite.

EXAMPLE IX

The use of the mineral powder with in situ drying has shown good insulating qualities in high vacuum cryogenic vessels. In such applications, even a very small amount of moisture in the powder develops into vapor so as to make evacuation of the insulating material difficult. Under the vacuum conditions used to evacuate the insulation chamber of cryogenic vessels, as for example in Dewar bottles, moisture which is not chemically tied up continuously vaporizes. This vapor reduces the which is the equilibrium moisture content of the perlite at 50% relative humidity atmosphere. Maintaining perlite dry on storage in paper bags was found to be difficult where the moisture content had to remain below the 0.9% level.

About 3% of hot lime was added to the perlite powder containing the 0.9% moisture. The mixture was stored in a metal drum for several weeks. An analysis showed the volatile moisture content of the powder to be between 0.0% and 0.15%. The humidity of the air above the powder in the drum was about 2.0%, indicating that the hot lime had absorbed the moisture from the powder, as well as from the occluded air in the mix. A vacuum pump was attached to a container containing a small quantity of the perlite and hot lime mix. It was observed that the vacuum could be more readily pulled than on the container which had held regular perlite stored in paper bags at 60% humidity.

While the invention has been illustrated by reference to specific embodiments, there is no intent to limit the spirit or scope of the invention to the precise details except insofar as defined in the following claims.

I claim:
1. A ballasted pneumatic vehicle tire comprising a resilient vehicle tire having an annular sealed chamber inflatable with gas under pressure, a particle ballast essentially completely filling said chamber while at rest, a gas maintained in said chamber under pressure to inflate the tire, said ballast comprising freely flowing small particles which are essentially completely dry and essentially non-packing, and a sufficient amount of a cushion material mixed through said ballast to retain the essential pneumatic characteristics of the tire, said cushion material being expanded and containing occluded gas, said cushion material being resilient and capable of changing its specific volume under load pressures and to restore to essentially original volume on release of the pressure so as to provide flexing of the tire under load pressures.

2. A ballasted tire according to claim 1 in which a non-reversible desiccant is included so as to maintain the ballast dry and free flowing.

3. A ballasted tire according to claim 1 in which the cushion material is an expanded mineral.

4. A ballasted tire according to claim 1 in which the cushion material is an expanded synthetic resin.

5. A ballasted tire according to claim 1 in which the cushion material is expanded vermiculite.

6. A ballasted tire according to claim 1 in which the cushion material is present in an amount of from 5 to 25% by volume.

7. A ballasted pneumatic vehicle tire comprising a resilient vehicle tire having an annular sealed chamber inflatable with gas under pressure, a particle ballast essentially completely filling said chamber while at rest, a significant amount of a non-reversible desiccant dispersed throughout the ballast, a gas maintained in said chamber under pressure to inflate the tire, said ballast comprising freely flowing small particles which are essentially completely dry and essentially non-packing, and a sufficient amount of a cushion material mixed through said ballast to retain the essential pneumatic characteristics of the tire, said cushion material being an expanded and resilient material having a plurality of voids therein and capable of changing its specific volume under load pressures and restoring to essentially original volume on release of the pressure so as to provide flexing of the tire under load pressures.

8. A ballasted pneumatic vehicle tire comprising a resilient vehicle tire having an annular sealed chamber inflatable with gas under pressure, a particle ballast essentially completely filling said chamber while at rest, a gas maintained in said chamber under pressure to inflate the tire, said ballast comprising freely flowing small non-compressible particles which are essentially non-packing and essentially completely dry, a sufficient amount of a cushion material mixed throughout said ballast to retain the essential pneumatic characteristics of the tire, said cushion material being an expanded and resilient porous material capable of changing in specific volume under load pressures and returning to original volume on no load conditions, so as to retain the essential pneumatic characteristics of the tire.

9. A ballasted tire according to claim 8 in which the non-compressible particles are in the size range of about +10 to −200 mesh mineral particles.

10. A ballasted tire according to claim 8 in which the cushion material is 10–100 mesh expanded material, present in an amount of from 5–25% by volume.

11. Ballast for pneumatic vehicle tires having an annular sealed chamber inflatable with gas under pressure, comprising a particle ballast for completely filling the tire chamber, said ballast comprising freely flowing small non-compressible particles which are essentially dry and essentially non-packing, a sufficient amount of a cushion material mixed through said ballast to retain the essential pneumatic characteristics of the tire, and said cushion material being expanded and resilient and capable of changing its specific volume under load pressures and to restore to essentially original volume on release of the pressures.

12. Ballast for pneumatic vehicle tires having an annular sealed chamber inflatable with gas under pressure, comprising a particle ballast for completely filling the tire chamber, said ballast comprising freely flowing small non-compressible particles which are essentially dry and essentially non-packing, a sufficient amount of a cushion material mixed through said ballast to retain the essential pneumatic characteristics of the tire, said cushion material being expanded and resilient and capable of changing its specific volume under load pressures and to restore to essentially original volume on release of the pressure, and a small amount of a non-reversible desiccant which chemically reacts with free moisture in the ballast to maintain it dry and free flowing.

13. Ballast for vessels having a sealed chamber, comprising a particle ballast for completely filling the chamber, said ballast comprising freely flowing small non-compressible particles which are essentially dry and essentially non-packing, a sufficient amount of a cushion material mixed through said ballast to provide essential pneumatic characteristics of the ballast in the vessel, and said cushion material being expanded and resilient and capable of changing its specific volume under load pressures and to restore to essentially original volume on release of the load.

14. Ballast for vessels having a sealed chamber comprising a mineral particle ballast for completely filling the chamber, said ballast comprising freely flowing small non-compressible mineral particles which are essentially dry and essentially non-packing, a sufficient amount of a cushion material mixed through said ballast to provide essential pneumatic characteristics of the ballast in the vessel, said cushion material being expanded and resilient and capable of changing its specific volume under load pressures and to restore to essentially original volume on release of the load, and a small amount of a non-reversible desiccant which chemically reacts with free moisture in the ballast to maintain it dry and free flowing.

References Cited by the Examiner
UNITED STATES PATENTS
3,008,506   11/1961   Hicks _____ 152—330

ARTHUR L. LA POINT, *Primary Examiner.*